INVENTORS.
RICHARD STEINBERG
VICTOR F. CARTWRIGHT
BY
Christie, Parker & Hale
ATTORNEYS Oct. 10, 1961  R. STEINBERG ET AL  3,004,254
AIRCRAFT COLLISION WARNING SYSTEM
Filed May 13, 1957  7 Sheets-Sheet 5
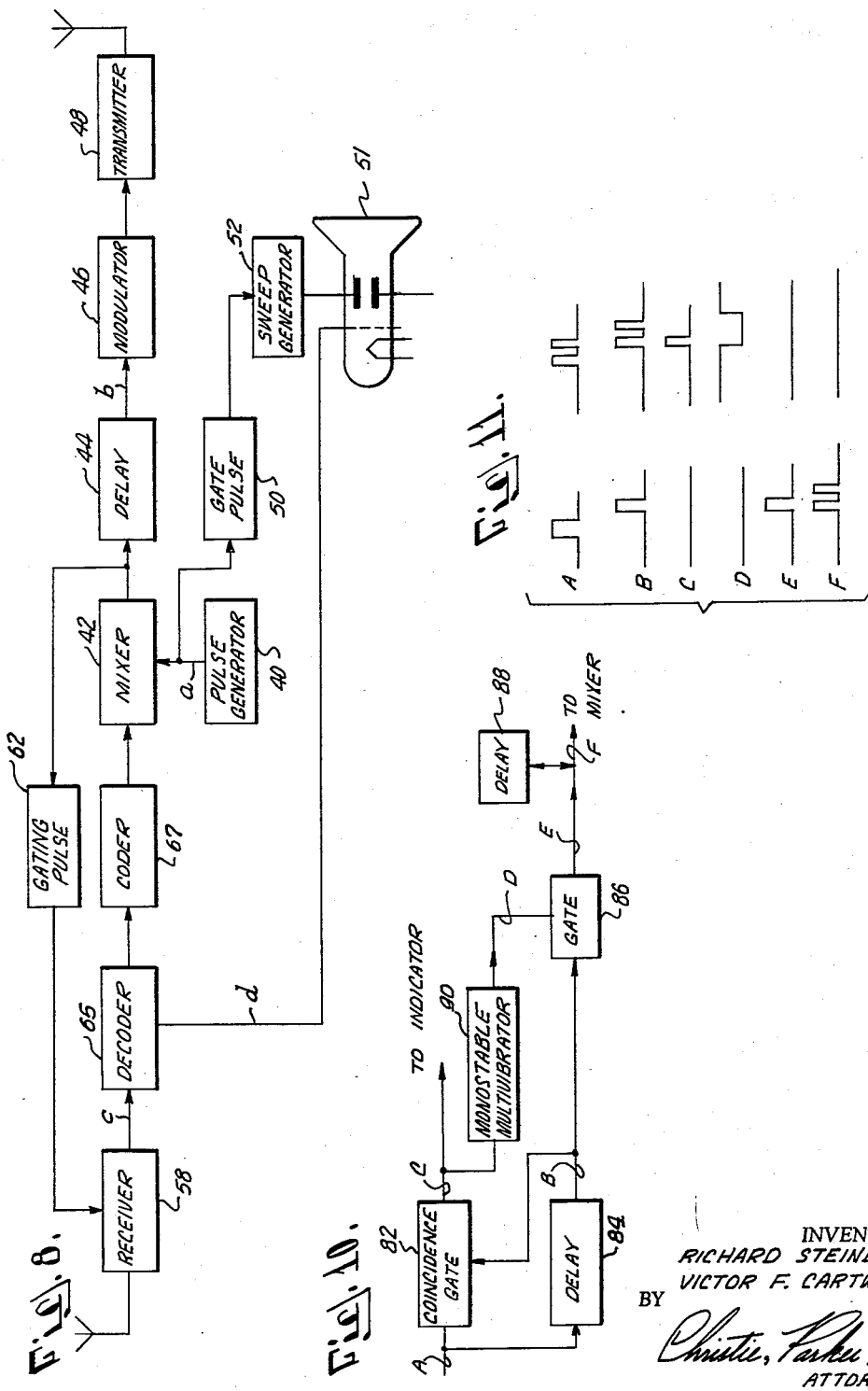
INVENTORS.
RICHARD STEINBERG
VICTOR F. CARTWRIGHT
BY
Christie, Parker & Hale
ATTORNEYS.

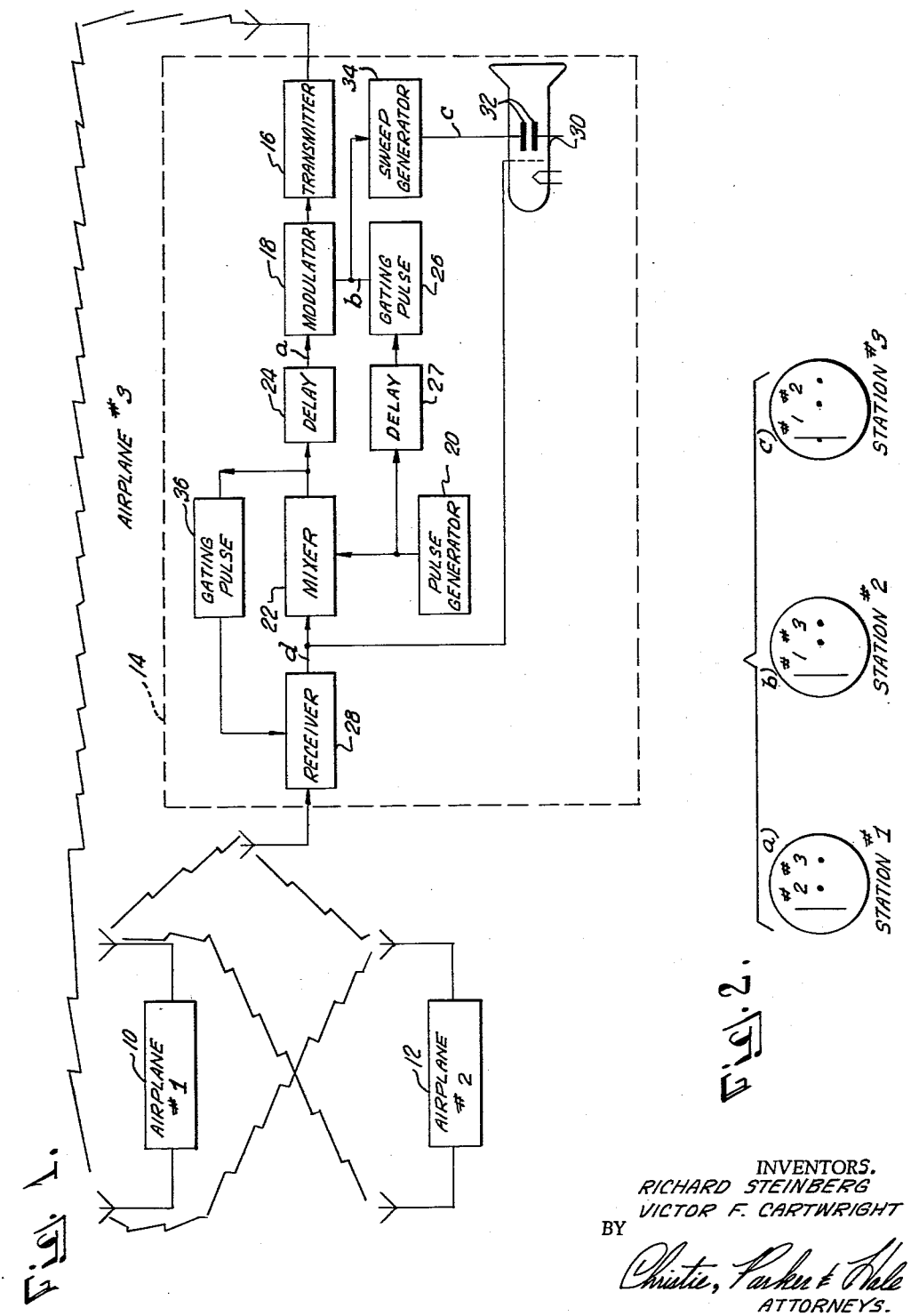

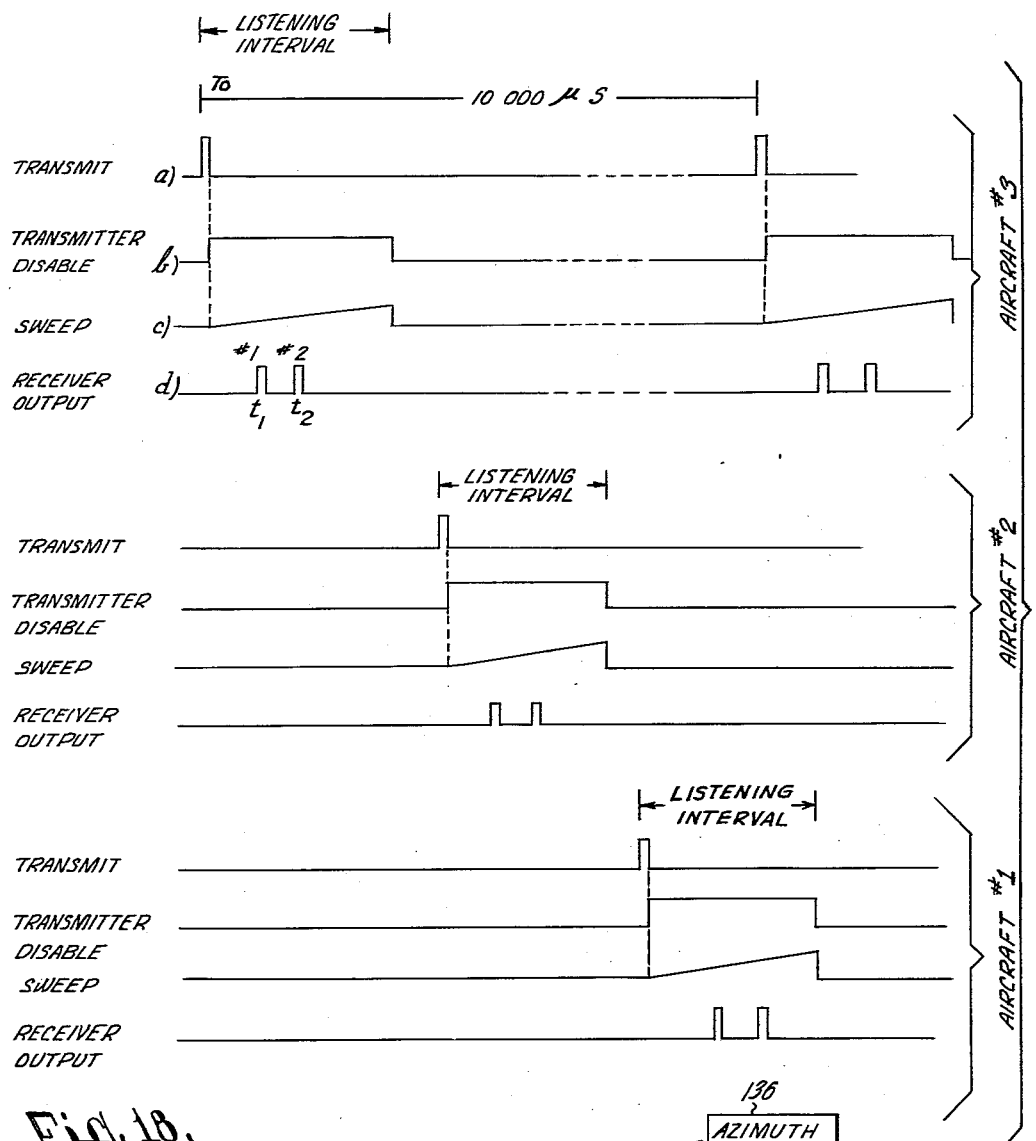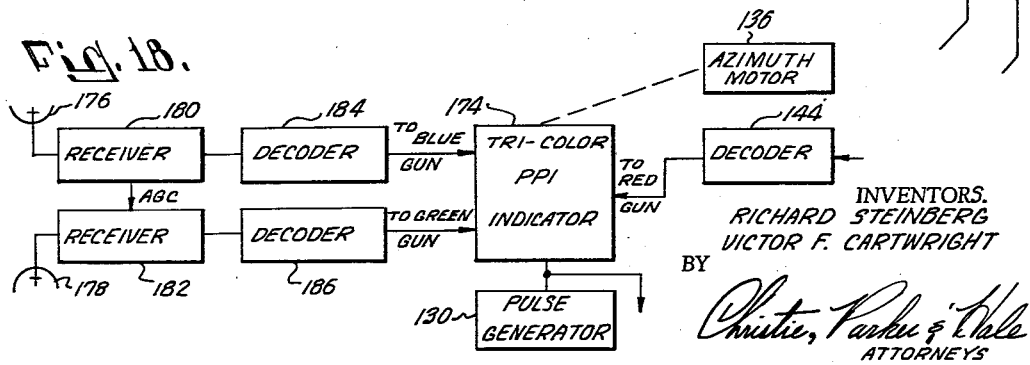

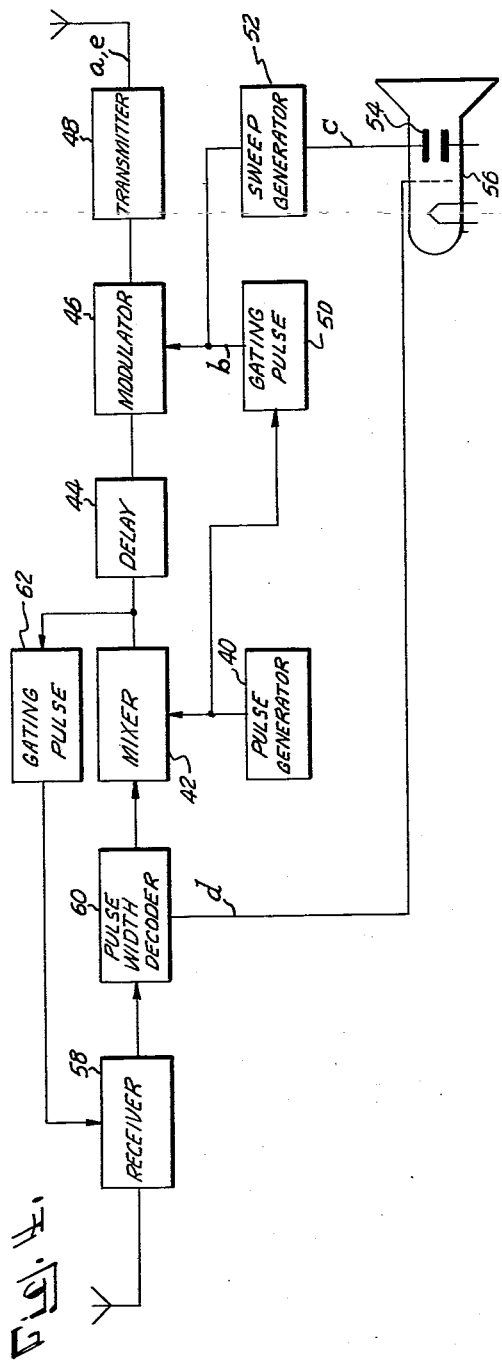
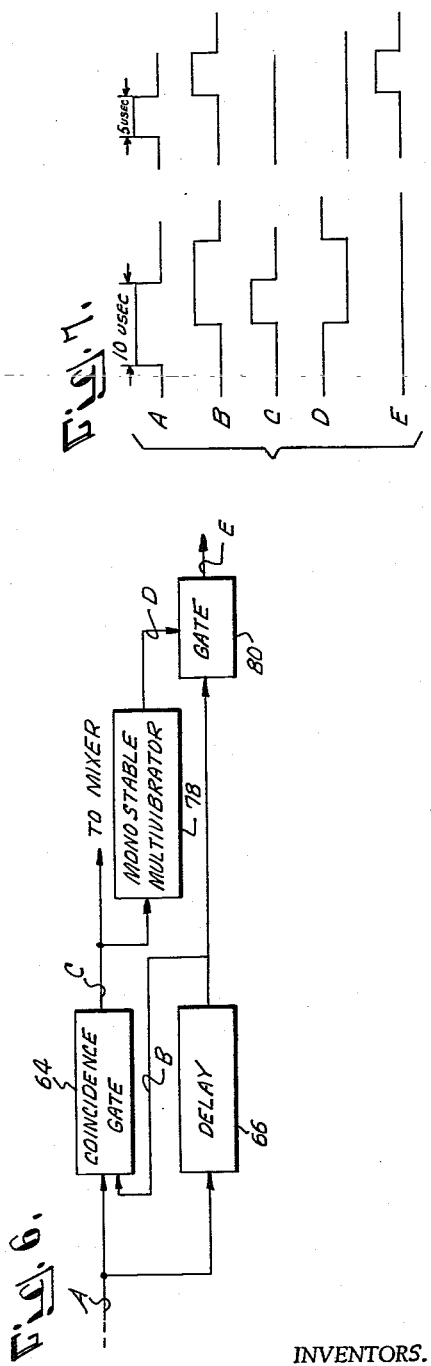

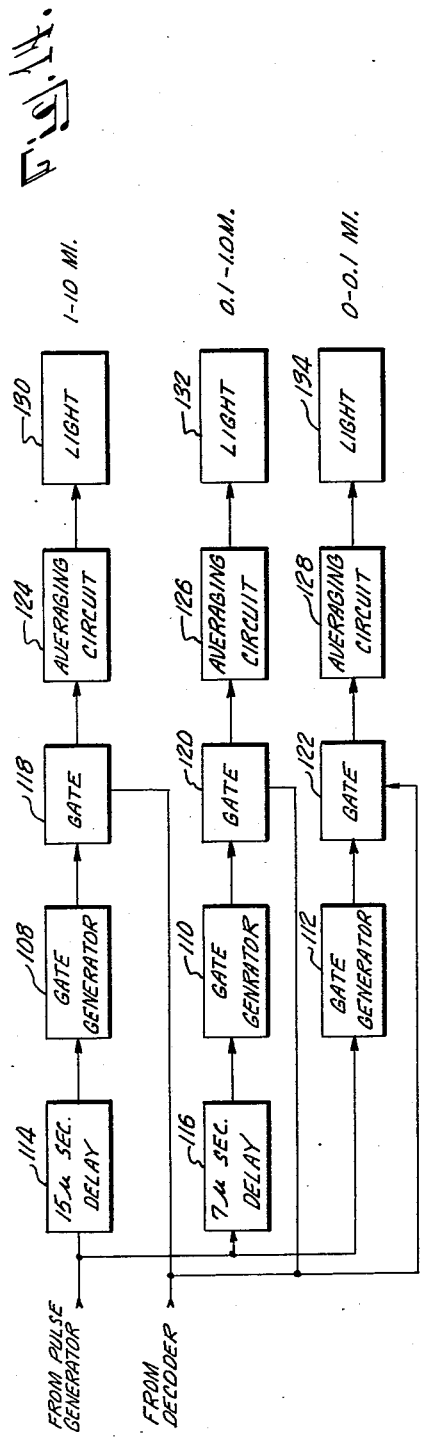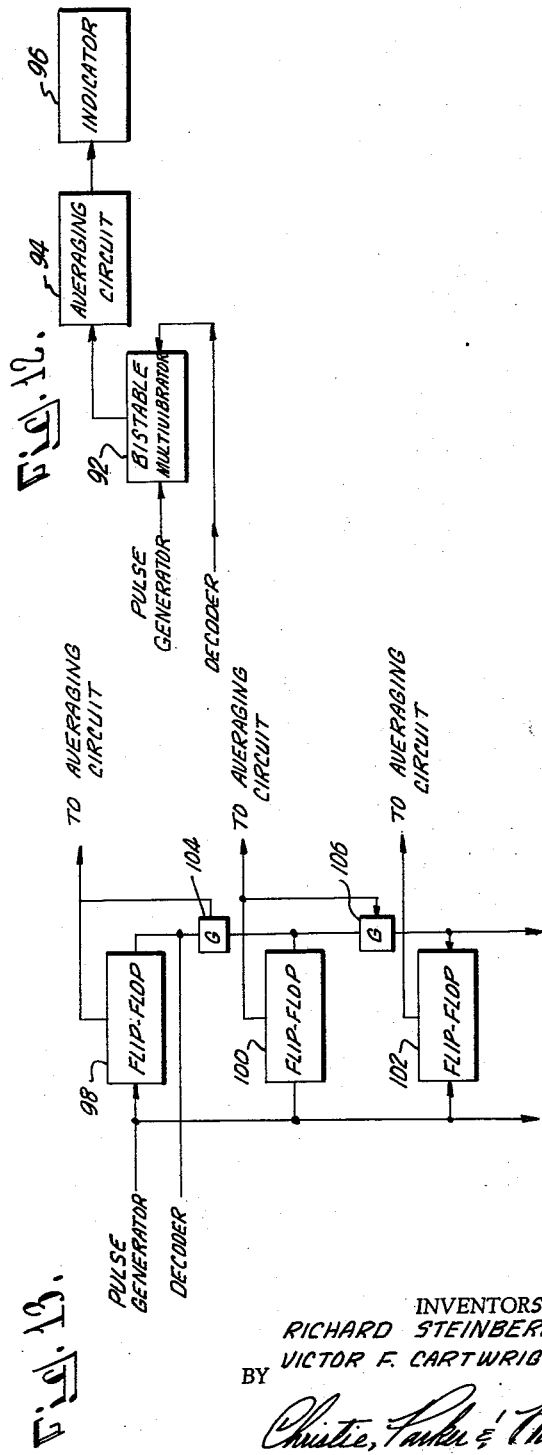

Oct. 10, 1961     R. STEINBERG ET AL     3,004,254
AIRCRAFT COLLISION WARNING SYSTEM
Filed May 13, 1957     7 Sheets-Sheet 7

INVENTORS,
RICHARD STEINBERG
VICTOR F. CARTWRIGHT
BY
    Christie, Parker & Hale
          ATTORNEYS.

United States Patent Office 3,004,254
Patented Oct. 10, 1961

3,004,254
AIRCRAFT COLLISION WARNING SYSTEM
Richard Steinberg, Mar Vista, and Victor F. Cartwright, Pasadena, Calif., assignors to Ralph M. Parsons Company, Los Angeles, Calif., a corporation of California
Filed May 13, 1957, Ser. No. 658,658
22 Claims. (Cl. 343—6.8)

This invention relates generally to radio ranging equipment, and more particularly, is concerned with a collision warning system for operation between aircraft and the like.

With the ever increasing amount of air traffic and with the ever increasing speed of aircraft, the need for collision warning equipment has become acute. Pilots can no longer rely on visual contact alone. Various means are presently known in the art for locating other aircraft by radio means. For example, radar equipment has been highly developed for pinpointing the location of other aircraft. Radar has several limitations, however, which are not particularly desirable in using it for collision warning. For one thing, the radiating beam must be fairly narrow to get sufficient energy reflection from the target to be detected by the receiver. Thus, the beam must be continually scanned in order to cover the entire sky surrounding the airplane to detect other aircraft in the vicinity.

P.P.I. type radar has been used with some success in ships to detect other ships in the vicinity where sight contact is not possible, as in fog or in darkness. However, this technique has not proved particularly successful in tracking high-speed aircraft. Moreover, because of the high attenuation between the transmitted signal and the received signal in radar, high frequencies and large powers are required, the high frequencies being required to get sufficient directivity and the high power to get sufficient energy reflected back from the target to be detected. This involves costly transmission equipment. Moreover, each radar unit must operate at a different frequency to avoid interference.

Another arrangement which has been considered for a collision warning device is the use of a ringing closed-loop transmission system involving transponders at each of two aircraft to form a closed transmission loop. The frequency at which this closed loop oscillates is a function of the distance between the two transponders. By measuring the frequency, the range of the other aircraft is readily ascertained. The transponders have the advantage over radar that they can operate at relatively low powers, may be non-directional, and are relatively simple in construction. This system is not particularly suitable, however, where a number of aircraft are involved, since it would not be practical to form a closed loop with more than one aircraft at a time.

The present invention provides a collision warning system which combines the relative simplicity and low-power operation of the closed-loop ringing transponder arrangement and yet permits operation between any number of aircraft. It permits the use of a single carrier frequency for all aircraft, and may be operated on an established radio band without interference to other communications in the band. Unless directional information is desired, the warning system of the present invention may be operated at long wavelengths at relatively low powers and with non-directional antenna arrangements. The cost of the airborne units making up this system can be made inexpensively enough so that the light-plane operators can install the units with a minimum of expense. At the same time, the units can be readily enlarged and expanded in more elegant forms for commercial aircraft to provide additional information beyond merely warning of the presence of other aircraft.

In brief, the present invention contemplates a system incorporating transponders located in all aircraft. The transponders are all identical and each include a transmitter and receiver tuned to a common carrier frequency. Each of the units further includes means for generating a continuous train of pulses, the pulse generating means in each of the transponders having substantially but not identically the same repetition frequency. These pulses are transmitted by each of the units. Pulses received from other units, according to one form of the invention, are re-transmitted as they are received except that the transmitter is gated off for a portion of the period following each of the locally generated pulses. The received pulses are used to bias on the beam of a cathode ray indicator tube, the beam of which is swept through its horizontal extent during the interval the transmitter is turned off. By this arrangement, pulses received during the interval the transmitter is cut off, turn on the beam momentarily to provide an indication of a return pulse. This system depends on the integrating property of the cathode ray screen to distinguish between pulses received from a remote transponder in answer to pulses transmitted, referred to as reply pulses, and pulses generated by the pulse generator in a remote airplane, referred to as the interrogating pulses. Only the reply pulses are synchronized with the cathode ray tube sweep and are capable of producing an image on the screen.

According to another form of the invention, discrimination between interrogating pulses and reply pulses at the receiver is accomplished by a coding arrangement wherein interrogation pulses are coded differently than the reply pulses. This may be accomplished, for example, by interrogating with a single pulse and replying with a double pulse, or by interrogating with a long pulse and replying with a short pulse.

In addition to using a cathode ray tube as a distance indicator, various other indicating means may be employed, such as lights, or meters, which indicate the presence of aircraft within a certain range, or audio means which sounds a warning whenever an aircraft comes within a predetermined range.

For a better understanding of the invention, reference should be had to the accompanying drawings, wherein:

FIG. 1 is a block diagram of the system including a more detailed block diagram of one of the stations according to one embodiment of the invention;

FIG. 2 is a diagrammatic showing of the cathode ray indication in each of the airplane stations of FIG. 1;

FIG. 3 is a timing diagram used for explaining the operation of the warning system of FIG. 1;

FIG. 4 is a block diagram of an aircraft transponder unit according to a modified form of the invention;

FIG. 6 is a block diagram of the pulse width decoder in the circuit of FIG. 4;

FIG. 7 is a graphical plot of a series of wave forms used in explaining the operation of the decoder of FIG. 6;

FIG. 8 is a block diagram of an aircraft transponder unit according to a further modification of the invention;

FIG. 10 is a block diagram of the decoder and coder in the circuit of FIG. 8;

FIG. 11 is a series of wave forms used in explaining the operation of the circuit of FIG. 10;

FIG. 12 is a simplified indicator used with the transponders of FIGS. 4 and 8;

FIGS. 13 and 14 show additional indicator arrangements suitable for indicating a number of aircraft;

FIG. 18 shows a modification of the transponder circuit of FIG. 15 for providing relative altitude information of other aircraft.

Figure 5:
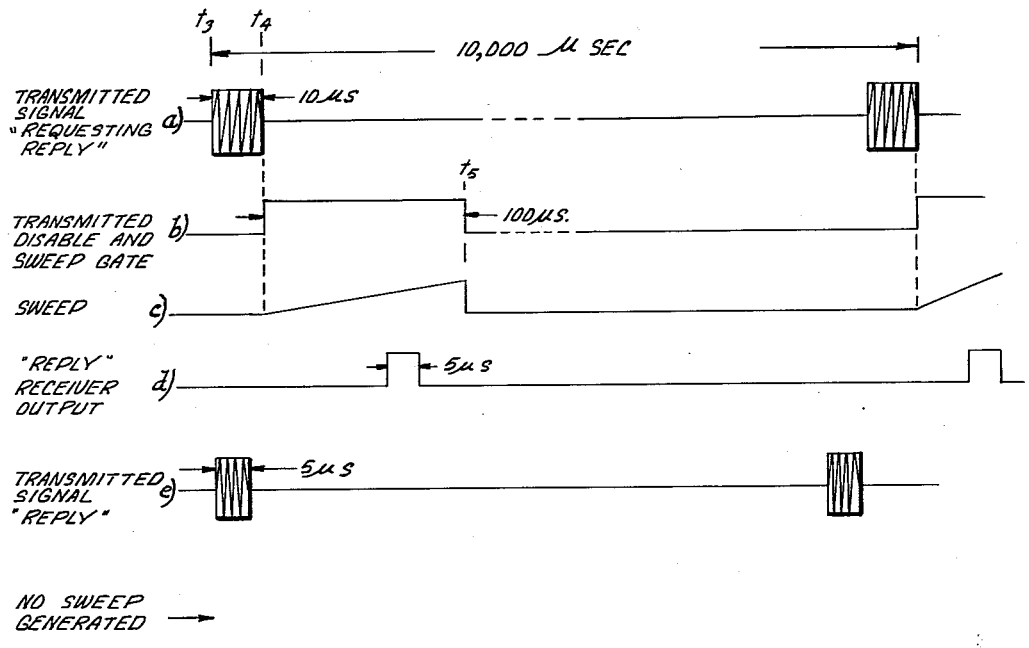
FIG. 5 is a timing diagram used for explaining the operation of the circuit of FIG. 4.

Referring to FIG. 1 in detail, a collision warning system involving three airplanes is shown. The transponder units at the airplanes, indicated generally at 10, 12, and 14 respectively, are identical. Although three airplane transponder units are indicated, it will be understood that any number of airplanes with their transponder units may be involved.

Each transponder unit, as shown in more detail in connection with the transponder unit 14 of the #3 airplane, includes a transmitter 16 driven by a modulator 18. Local pulses are generated by a pulse generator 20 which may be, for example, a free-running blocking oscillator or other suitable means for generating periodic pulses. The period of the pulses from the source 20 may be of the order of 10,000 microseconds. The output from the pulse generator 20 is coupled through a mixer 22 to the modulator 18 through a delay network 24. These pulses from the transmitter 16, referred to as interrogation pulses, are transmitted to other airplanes within range of the transmitter.

The output from the pulse generator 20 is also coupled to a gating pulse generator 26 which produces a long pulse of the order of 100 microseconds in duration in response to each of the pulses from the generator 20. The gating pulse is applied to the modulator 18 for biasing off the modulator for the duration of the gating pulse.

The transponder unit 14 also includes a receiver 28, the receiver including a suitable detector and video amplifier for producing output pulses in response to the received signals. The demodulated output of the receiver 28 is fed to the mixer 22 whereby it drives the transmitter 16 through the modulator 18.

The output from the receiver 28 is also fed to the control grid of a cathode ray tube indicator 30 for intensity modulating the beam. Thus, every time a pulse is derived from the receiver 28, the beam of the cathode ray tube indicator 30 is biased on for the duration of the pulse.

A sweep voltage is applied to the horizontal deflection plates 32 from a sweep generator 34. The sweep generator 34 is arranged to produce a single saw-tooth wave in response to the output from the gating pulse generator 26 whereby the beam of the cathode ray tube indicator 30 is swept across the screen in 100 microseconds, the duration time of the gating pulse from the generator 26. Thus the beam is swept across the tube screen during the time the modulator 18 is gated off to disable the transmitter.

In order that the transmitter 16 will not overload the receiver 28, since the transmitter 16 and the receiver 28 are tuned to the same carrier frequency, the output from the mixer 22 is applied to a gating pulse generator 36. The output from the gating pulse generator 36 biases off the receiver 28 for a short interval whenever a pulse is derived from the mixer 22. By virtue of the time delay circuit 24, the receiver is biased off before the transmitted pulse is radiated. While separate antennas have been shown for the transmitter 16 and the receiver 28, it will be understood that a single antenna with a suitable duplexer circuit may be employed if desired in accordance with conventional transponder practice.

Operation of the circuit of FIG. 1 can best be appreciated by considering the timing diagrams of FIG. 3. As shown in FIG. 3(a), the transponder 14 of #3 airplane puts out a transmitted interrogation pulse of 5 microseconds' duration, following which the modulator is gated off. Normally the rise time of the gating pulse from the gating pulse generator 26 is sufficiently long to delay the biasing off of the modulator 18 until a pulse is transmitted. However, an additional delay, as indicated at 27, may be provided between the pulse generator 20 and the gating pulse generator 26 to insure that the modulator 18 is not biased off until the modulated carrier pulse has been transmitted. The transmitter is thereby disabled for a period of 100 microseconds, referred to as the listening interval, as shown in FIG. 3(b). During the time the transmitter is diabled, a sweep voltage is applied to the cathode ray tube indicator 30, the wave form of the sweep voltage being shown in FIG. 3(c).

The transmitted interrogation pulse at the #3 aircraft, generated at time $t_0$, is received some time later by the transponders 10 and 12 at the #1 and #2 aircraft respectively. Assuming for the moment that the transmitters of these two remote transponders are not disabled, i.e., the interrogation pulse is received at a time other than the listening interval of the transponders 10 and 12, reply pulses are automatically generated by these transponders. The reply pulses are generated by virtue of the interrogation pulse being detected by the respective remote receivers and fed through the mixers to the modulators, producing output pulses from the transmitters. The reply pulses are picked up by the receiver 28 at the #3 airplane during the listening interval following the transmission of the interrogation pulse. The reply pulses, after being detected and amplified by the receiver 28, bias on the beam of the cathode ray tube indicator 30, producing two spaced indications on the cathode ray tube screen, as shown in FIG. 2(c) at times $t_1$ and $t_2$.

Similarly, each of the other transponders 10 and 12 send out interrogation pulses which are received by the transponders of the other airplanes in the vicinity, which in turn send back reply pulses, producing indications on the respective cathode ray tube screens in the same manner as described above in connection with the transponder 14. FIGS. 2(a) and 2(b) show the indications at #1 and #2 airplanes respectively.

Discrimination between reply pulses and interrogation pulses is accomplished automatically. Each of the pulse generators in the respective transponders, while tuned to substantially the same pulse repetition frequency as the other pulse generators, is not frequency-stabilized or in any way phase-locked to pulse generators of the other transponders. It will be appreciated therefore that the phase relationship between the pulses generated by the pulse generators at the respective transponders is continually changing. For this reason, interrogation pulses received by a transponder in one airplane from the transponders in neighboring airplanes will not bear any particular phase relationship to the sweep of the cathode ray tube.

Interrogation pulses received during successive times when the beam on the cathode ray tube indicator is being swept across the face of the screen, will not turn the beam on at the same point in the sweep. The cathode ray tube screen acts as an integrator, since the intensity is a function of the average beam current and the average beam current at any given spot on the screen is a function of the number of successive sweeps in which the beam is turned on while passing that particular spot on the cathode ray screen. For this reason, interrogation pulses received from a remote transponder do not produce a visible indication on the cathode ray screen.

The reply pulses being synchronized with the sweep of the cathode ray beam, bias the beam on at the same point in the sweep of the cathode ray tube beam over a number of successive cycles of the sweep generator. However, interrogation pulses received from other transponders, since they bear a random phase relationship with respect to the sweep of the cathode ray tube, do not illuminate the same spot on successive sweeps of the cathode ray beam and therefore do not produce a visible image on the cathode ray tube screen. While interrogation pulses received by a transponder during the time its transmitter is disabled cannot produce a reply pulse, since the period of time that the transmitter is disabled is a small fraction of the basic pulse repetition interval, only a few of the randomly received interrogation pulses will be ineffectual in generating reply pulses.

Rather than relying on the integrating effect of a cathode ray tube indicator for discriminating between interrogation and reply pulses, some form of coding may be incorporated in the transponder circuit whereby interrogation pulses are coded differently than reply pulses. Interrogation pulses and reply pulses can then be separated by suitable decoding means. One such arrangement using pulse width coding is shown in FIG. 4.

In the arrangement of FIG. 4, a pulse generator 40 is provided which produces periodic pulses in which pulse length is, for example, of the order of 10 microseconds, which is twice the duration of the pulses produced by the pulse generator 20 in the circuit of FIG. 1. These long pulses are fed to a mixer 42 from which they are coupled through a delay 44 to a modulator 46 for pulse modulating a transmitter 48. As in the circuit of FIG. 1, the pulse generator 40 also operates a gating pulse generator 50 which biases off the modulator 46 for a predetermined interval, and at the same time gates on a linearly increasing voltage by means of a sweep generator 52, the output of which is coupled to the horizontal deflection plates 54 of the cathode ray tube indicator 56. As shown in the waveforms of FIG. 5, the modulator 46 is gated off starting with the end of the transmitted pulse. This may be accomplished by triggering the gating pulse generator 50 in response to the trailing edge of the triggering pulse from the generator 40, for example, or sufficient delay by a suitable delay circuit may be provided between the pulse generator 40 and the gating pulse generator 50 to delay the biasing off of the modulator 46 until after the transmitter is pulsed.

Each of the transponders is arranged to generate a short pulse as a reply in response to an interrogation pulse. Interrogation pulses from other transponders as well as reply pulses, distinguished from each other by their duration, are received by a receiver 58 which includes a suitable detector and video amplifier. The output from the receiver 58 is applied to a pulse width decoder 60 having two outputs, one of which is coupled to the mixer 42 and the other of which is coupled to the beam control grid of the cathode ray tube indicator 56. By virtue of the decoder 60, which will hereandafter be described in more detail, a long pulse received by the receiver 58 produces a short pulse that is passed through the mixer 42 to be transmitted by the transmitter 48 as a reply. A short pulse, namely, a reply pulse, received at the receiver 58 is directed by the decoder 60 to a cathode ray tube indicator 56 for producing an indication thereon.

As in the circuit of FIG. 1, the gating pulse generator 62 is provided for gating off the receiver 58 during the time a pulse is being transmitted to prevent overloading of the receiver. FIG. 5 shows the wave forms produced by the circuit of FIG. 4 at the correspondingly lettered positions.

A suitable pulse width decoder circuit is shown in FIG. 6, the wave forms at the indicated positions in the decoder circuit being shown in FIG. 7. Thus the output of the receiver is connected to a coincidence gate 64, the output of which is coupled to the mixer 42. The output from the receiver 58 is also coupled to a delay circuit 66, the output of which is also connected to the coincidence gate 64. The delay circuit 66 introduces a delay of slightly more than the duration of the short reply pulses but less than the duration of the longer interrogation pulses. Thus if long pulses are derived from the receiver and applied to the coincidence gate 64 there will be an overlapping period of time between the pulse applied directly to the gate 64 and the delayed pulse applied to the gate 64, resulting in an output pulse during the overlapping time interval. This pulse is passed to the mixer and is transmitted as a short-duration reply pulse.

The output from the coincidence gate 64 also triggers on a monostable multivibrator 78, the output of which controls a normally open gate circuit 80. The gate circuit 80 couples the output of delay circuit 66 to the beam intensity control of the cathode ray tube indicator 56. If the monostable multivibrator 78 is triggered on by an output pulse from the coincidence gate 64, it closes the gate 80 for a period of time sufficiently long to block the transfer of the delayed pulse from the circuit 66 to the cathode ray tube indicator 56. However, if no pulse is derived from the coincidence gate 64, as is the case when a short reply pulse is derived from the receiver 58, the gate 80 remains open. Thus the delayed pulse from the delay circuit 66 is passed to the beam intensity control of the cathode ray tube indicator 56.

FIG. 7 shows the wave forms at the corresponding lettered positions in the circuit of FIG. 6, the first column of wave forms corresponding to operation with a received long pulse, and the other column showing the wave forms in response to a short pulse from the receiver 58.

It should be noted that although the coding technique provides a means of discriminating between reply pulses and interrogation pulses derived from the receiver 58, it does not provide a means for discriminating between reply pulses generated at a remote transponder in response to interrogation pulses from the local transponder as opposed to reply pulses generated at the remote transponder in response to interrogation pulses from other remote transponders. However, since reply pulses responsive to locally generated interrogation pulses have a fixed phase relationship to the output of the local pulse generator 40, only these reply pulses will produce an indication on the cathode ray tube screen due to the integrating effect of the cathode ray tube as above-described. All other reply pulses from the receiver 58 will bear random phase relationship to the local pulse generator 40 and therefore will not produce any indication on the cathode ray tube screen 56.

Other forms of coding may be used to distinguish between interrogation and reply pulses. For example, the reply pulse may be in the form of a pulse doublet in contrast to the single interrogation pulse. The circuit of FIG. 8 is substantially identical to that of FIG. 4 except for the decoder and coder circuits indicated generally at 65 and 67 respectively. The decoder and coder circuit of FIG. 8 is shown in more detail in FIG. 10 together with the associated wave forms which are shown in FIG. 11.

Figure 9:
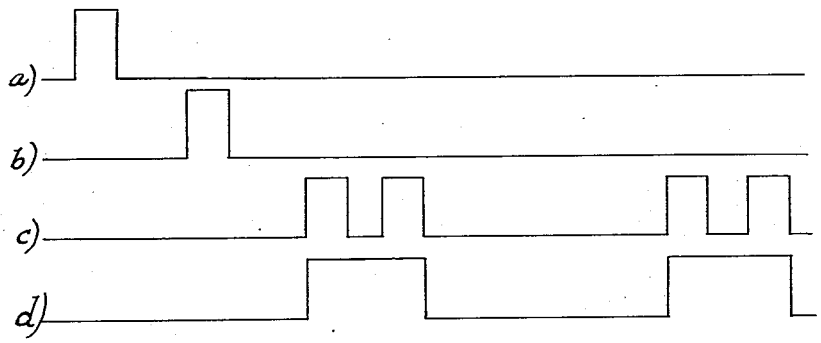
FIG. 9 is a timing diagram used in explaining the operation of the circuit of FIG. 8.

In the arrangement of FIG. 8 a single pulse is transmitted in response to an output from the pulse generator 40. The reply pulse that comes back is a pulse doublet as derived from the receiver 58. The waveform at corresponding lettered positions for FIG. 8 are shown in FIG. 9. However, if the pulse derived from the receiver 58 is not a doublet, it represents an interrogation pulse from another transponder. The demodulated output from the receiver 58 is applied to a coincidence gate 82 in the decoder 65, as shown in FIG. 10. It is also applied to the coincidence gate through a delay circuit 84, introducing a delay time substantially twice the duration of a pulse. The output of the coincidence gate 82 is applied to the beam intensity control grid of the cathode ray tube indicator 56.

It will be seen, as shown by the wave forms in the left hand column of FIG. 11, that no output is derived from the coincidence gate 82 if a single pulse is derived from the receiver 58. The output of the delay circuit 84, however, is coupled through a normally open gate 86 to the mixer 42. Coding is provided by a delay network 88, such as a shorted delay line for example. The delay network produces an echo pulse, which is also applied to the mixer 42. The result is a pulse doublet being applied to the modulator 46.

A pulse doublet, indicating a reply pulse, is derived from the receiver 58 and applied to the coincidence gate 82 and delay circuit 84. An output pulse will be derived from the coincidence gate through the coincidence between the delayed first pulse of the doublet and the second pulse of the doublet as they are applied to the coincidence gate 82. The resulting pulse from the output of the coincidence gate is applied to the cathode ray tube indicator. The output pulse from the coincidence gate 82 is also applied to a monostable multivibrator 90, the output of which is applied to the gate 86 for gating the gate 86 off to block the pulse doublet from the delay circuit 84 from being passed to the mixer 42.

Where decoding is used in the manner described above in connection with FIG. 4 and also FIG. 8, the transponder circuit is capable of distinguishing between interrogation pulses and reply pulses. Only interrogation pulses are passed to the modulator and transmitter. Thus in contrast to the circuit of FIG. 1, no disabling of the modulator is required following the transmission of an interrogation pulse. While such disabling has been shown in the circuit of FIG. 4, it is not shown in the circuit of FIG. 8 for the reason that it is not necessary where decoding is provided.

In all the above-described circuits, intensity modulation of a cathode ray tube indicator is shown. The arrangements of FIGS. 4 and 8 may alternatively employ a less expensive type of indicator which automatically gives a warning whenever another aircraft approaches within a predetermined minimum safe distance. This may be accomplished by the indicator circuit arrangement shown in FIG. 12 which includes a bistable multivibrator 92 connected to the output of the local pulse generator and the decoder. The length of time the bistable multivibrator is triggered to one of its stable states is determined by the length of time it takes for a reply pulse to come back to the transponder from a remote aircraft in response to an interrogation pulse. The output of the bistable multivibrator is applied to an averaging circuit 94 which produces a D.C. output signal, the potential level of which varies with the direct function of the distance to the nearest aircraft. It will be noted that the bistable multivibrator 92 is returned to its initial stable state by the first reply pulse derived from the decoder and therefore the output indication is indicative of the distance of the closest aircraft. Any suitable indicator responsive to the D.C. level of the output of the average circuit 94 may be provided, such as a D.C. meter, a light that is biased to turn on when the D.C. level reaches a certain predetermined value, or a horn which is arranged to be turned on when the D.C. level reaches a predetermined value.

This type of indicator can be expanded to provide a similar indication for additional aircraft in the vicinity. In this arrangement, as shown in FIG. 13, the output of the pulse generator is fed to a plurality of bistable multivibrators or flip-flop circuits 98, 100, and 102, the pulse generator output triggering each of these flip-flops to one of its two stable states. The output of the decoder is fed to each of the flip-flops for setting the flip-flops to their opposite bistable state, just as in the circuit of FIG. 12. However, for all of the flip-flops except the first flip-flop 98, the output from the decoder is coupled through a gate circuit, such as indicated at 104 and 106. Each of these gates is turned on in response to the previous one of the flip-flops when it is returned to its initial stable state by the output of the decoder. Thus it will be seen that if a number of aircraft at different distances send back reply pulses, which appear successively at the output of the decoder, the flip-flop 98 will be returned to its initial stable state by the reply pulse from the nearest aircraft. Triggering the flip-flop 98 to its initial stable state opens the gating circuit 104. Thus the next reply pulse from the next nearest aircraft is passed by the gate 104 to the flip-flop 100 to return it to its initial state, which in turn opens the gate 106. In this manner, the third nearest aircraft reply pulse is passed to the flip-flop 102 for returning it to its initial stable state. Additional flip-flops can be provided to accommodate returns up to any desired number of aircraft. As in the circuit of FIG. 12, the output of each of the flip-flops is fed to an averaging circuit from which a D.C. signal is derived indicative of the distance of the respective aircraft. The output of the several averaging circuits is then used to control individual indicators.

An indicating circuit which is simpler than the cathode ray tube indicator arrangement previously described, and yet which gives more information than the simple indicator circuits of FIGS. 12 and 13, is shown in FIG. 14. In this arrangement, indications are provided as to whether an aircraft is within a predetermined range. This is accomplished by feeding the output from the pulse generator to gate generators, such as indicated at 108, 110, and 112, with varying amounts of delay as introduced by the delay circuits 114 and 116. Each of the gate generators operates a gating circuit, as indicated at 118, 120, and 122. The output from the decoder is coupled to each of the gates 118, 120, and 122 also. The outputs from the gate circuits are passed through the associated averaging circuits 124, 126, and 128, the D.C. outputs from the averaging circuits being used to turn on associated lights, for example, such as indicated at 130, 132, and 134. Each of the gate generators is arranged to gate open the associated gating circuits for a period of time corresponding to a predetermined range, and the time delays introduced between the output of the pulse generator and the gate generators are also arranged to correspond to predetermined delays. Thus the delay circuit 114 introduces a delay time corresponding to a range of one mile, and the associated gate generator 108 gates open the gating circuit 118 for a period of time corresponding to a range of nine miles. Thus an aircraft having a range between 1 and 10 miles produces an indication on the light 130. The delay 116 introduces a delay corresponding to a range of 500 feet, or roughly 1/10 of a mile, and the associated gate generator 110 gates open the circuit 120 for a time corresponding to a range of 9/10 of a mile. Thus the light 132 produces an indication in response to any aircraft in the range of 1/10 of a mile to 1 mile. No time delay is provided between the pulse generator and the gating circuit 112, but the gating generator 112 turns on a gate circuit 122 for a period of time corresponding to a range of 1/10 of a mile. Thus the light 134 produces an indication when an aircraft is within the range of 0 to 1/10 of a mile.

By using directional antennas, azimuth information can be obtained in addition to the range information by the circuit arrangement of the present invention. It is not practical to use a single directional antenna for both transmitting interrogating pulses and receiving reply pulses, since if each transponder has a scanning directional antenna, the interrogating sampling frequency would be very small, being equal to the difference in the rate of rotation between the two transponder antennas.

Figure 15:
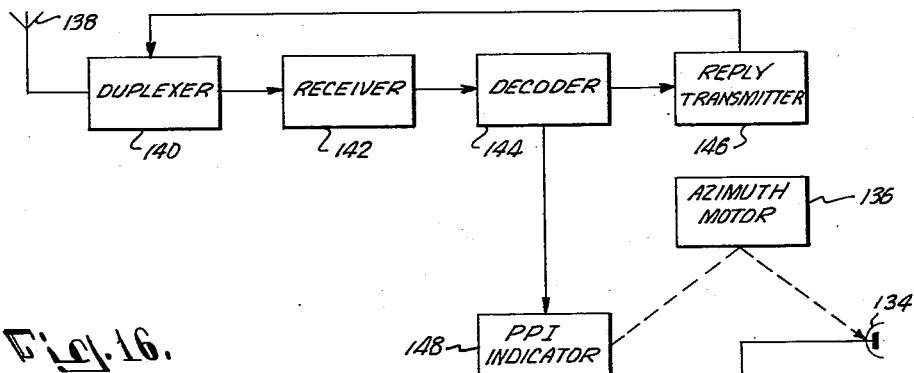
FIGS. 15 and 16 show a directional transponder unit with P.P.I. type presentation.

FIG. 15 shows a practical arrangement for combining azimuth and range information utilizing the principles of the present invention. In this arrangement, a pulse generator 130 pulses an interrogation transmitter 132 at periodic intervals. The output of the interrogation transmitter is fed to a directional antenna 134 which is continuously rotated to scan in azimuth by an azimuth motor 136. Reply pulses, as well as interrogation pulses from other transponders, are received by an omni-directional antenna 138 and fed through a duplexer 140 to a receiver 142. The pulses derived from the output of the receiver 142 are fed to a decoder 144. If the pulse length type of coding as taught in connection with the form of the invention in FIG. 4 is used, the decoder is of the type shown in FIG. 6. In response to received long pulses, pulses are directed to a reply transmitter 146, the output of which is connected to the antenna 138 through the duplexer 140. If a short pulse is received, indicating a reply, the output of the decoder 144 is fed to an indicator 148.

Figure 16:
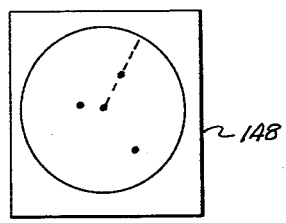

The indicator 148 is preferably a P.P.I. indicator which is best suited to showing range and azimuth information. As shown in FIG. 16, the P.P.I. indicator presents surrounding aircrafts as points on the P.P.I. indicator tube, the position of the local transponder corresponding to a point in the center of the P.P.I. tube. The polar coordinants of the dots indicating the surrounding aircraft are indicative of range and azimuth.

P.P.I. indicators are well known and form no part of the present invention. The azimuth sweep of the electron beams of the P.P.I. indicator tube is synchronized with the azimuth sweep of the antenna 134 and is generally provided by rotating the magnetic deflection yoke in the P.P.I. indicator by the azimuth motor 136. The radial range sweep of the electron beam in the cathode ray P.P.I. indicator tube is synchronized with the pulse generator 130 in the same manner as the sweep in the cathode ray tube presentation of FIGS. 1, 4, and 8. The output of the decoder 144 is used to intensity-modulate the cathode ray tube electron beam so as to produce an indication whenever a reply pulse is derived from the receiver 142.

Figure 17:
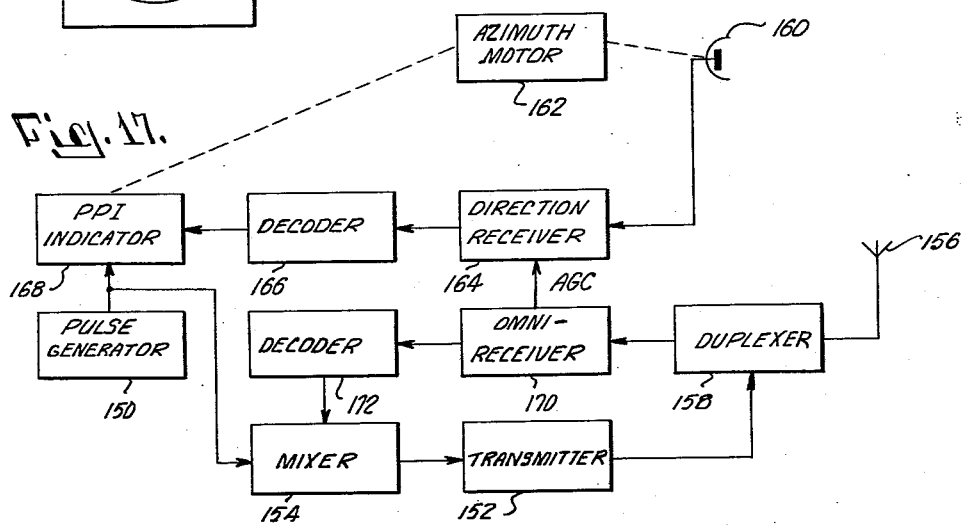
FIG. 17 shows an alternative transponder circuit giving range and azimuth information.

The arrangement of FIG. 15 depends on its operation on having a directional antenna with an extremely high front-to-back ratio of signal strength so as to discriminate between very close aircraft which are positioned 180° from aircraft at a much greater range. An alternative arrangement for providing both azimuth and range information, which avoids the stringent antenna requirements of the arrangement of FIG. 15, is shown in FIG. 17. In this arrangement, interrogation pulses are generated by a pulse generator 150, which are fed to a transmitter 152 through a mixer 154. The output of the transmitter 152 is fed to an omni-antenna 156 through a suitable duplexer circuit 158.

Reply pulses are received by a directional antenna 160 which is rotated in azimuth by an azimuth motor 162. The output of the antenna 160 is fed to a directional receiver 164, the demodulated output of the receiver 164 being fed to a decoder 166 from which reply pulses are derived. The reply pulses are used to modulate the beam on a P.P.I. indicator tube 168.

Interrogation pulses from other transponders are received by the omni-antenna 156 and fed through the duplexer 158 to an omni-receiver 170. The demodulated output of the receiver 170 is fed to a decoder 172 by means of which the reply pulses and interrogation pulses are separated. Interrogation pulses produce an output from the decoder 172 which is fed to the mixer 154 to be retransmitted back to the interrogating transponder.

Discrimination against strong signals coming from behind the directional antenna 160 is provided in the arrangement of FIG. 17 by applying the automatic gain control voltage generated in the receiver 170 to the receiver 164. By this arrangement, the gain of the receiver 164 is controlled by the strength of the signal received by the omni-antenna 156. Thus pulses received in the omni-directional antenna 156 from transponders located behind the directional antenna 160 substantially reduce the gain of the directional receiver 164 over what the gain would be if controlled by the signal received by the directional antenna 160. This prevents the unwanted signals from behind the directional antenna 160 from producing an indication on the P.P.I. indicator 168.

In addition to providing azimuth and range information, it may be desirable to know the relative altitude of a neighboring aircraft. One arrangement for providing this additional information is shown in FIG. 18. The circuit of FIG. 18 is a modification of that of FIG. 15, the circuit generally being identical except for the provision of a tri-color P.P.I. indicator 174 in place of the standard P.P.I. indicator 148. The tri-color P.P.I. indicator uses a three-color cathode ray tube, preferably of the type utilizing three cathode ray tube guns for three colors. The output of the decoder 144 may be coupled to the beam intensity control of the red gun of the tri-color P.P.I. indicator tube 174.

In addition, a pair of directional antennas 176 and 178, directed above the plane and below the plane respectively, are provided, the antennas 176 and 178 being coupled to receivers 180 and 182 respectively. The automatic gain control of the two receivers may be interconnected in the same manner as described in connection with the receivers 164 and 170 of FIG. 17. In this manner, the receiver to which the stronger signal is applied will dominate.

The output from the receivers are decoded by decoders 184 and 186 respectively, to derive reply pulses in contrast to interrogation pulses from other transponders. The reply pulses from the decoder 184 are used to intensity-modulate the blue gun of the tri-color P.P.I. indicator tube, while the reply pulses derived from the decoder 186 are applied to the green gun of the tri-color P.P.I. indicator tube. By this arrangement, if the neighboring aircraft are at the same altitude as the local aircraft, the dots representing neighboring aircraft appearing on the screen of the P.P.I. indicator are primarily white in color because all three guns are biased on. Aircraft at a higher or lower elevation will be shifted in color since only one of the blue or green guns will be turned on. In this manner, the color of the target indications on the P.P.I. indicator are indicative of the relative altitudes of the neighboring aircraft.

What is claimed is:

1. A warning system for indicating the proximity of other aircraft comprising a plurality of identical transponders, one of the transponders being located on each of the aircraft, each of the transponders including a transmitter and a receiver tuned to the same carrier frequency common to all transponders, means for generating a continuous train of pulses, the pulse generating means in each of the transponders having substantially but not identically the same repetition frequency, a mixer coupled to the output of the pulse generating means, means coupling the demodulated output of the receiver to the mixer, a modulator coupled to the output of the mixer, the modulator driving the transmitter in response to pulses from the mixer, means for disabling the receiver during transmission of a pulse, and indicating means including enabling means coupled to the receiver and to the pulse generating means and adapted to enable the indicating means for a predetermined interval following each of the pulses from the pulse generating means, the indicating means being selectively responsive to pulses derived from the receiver output, the indicating means providing an indication of the time interval between the initiation of said predetermined interval and reception of the selected pulses derived from the receiver.

2. A warning system for indicating the proximity of other aircraft comprising a plurality of identical transponders, one of the transponders being located on each of the aircraft, each of the transponders including a transmitter and a receiver means for generating a continuous train of pulses, a mixer coupled to the output of the pulse generating means, means coupling the demodulated output of the receiver to the mixer, a modulator coupled to the output of the mixer, the modulator driving the transmitter in response to pulses from the mixer, means for disabling the receiver during transmission of a pulse, and indicating means including enabling means coupled to the receiver and to the pulse generating means and adapted to enable the indicating means for a predetermined interval following each of the pulses from the pulse generating means, the indicating means being selectively responsive to pulses derived from the receiver output, the indicating means providing an indication of the time interval between the initiation of said predetermined interval and reception of the selected pulses derived from the receiver.

3. In an aircraft presence warning system, a transponder for each aircraft comprising a transmitter and a receiver, means for generating a continuous train of pulses, a mixer coupled to the output of the pulse generating means, means coupling the demodulated output of the receiver to the mixer, a modulator coupled to the output of the mixer, the modulator driving the transmitter in response to pulses from the mixer, means for disabling the receiver during transmission of a pulse, and indicating means including enabling means coupled to the receiver and to the pulse generating means and adapted to enable the indicating means for a predetermined interval following each of the pulses from the pulse generating means, the indicating means being selectively responsive to pulses derived from the receiver output, the indicating means providing an indication of the time interval between the initiation of said predetermined interval and reception of the selected pulses derived from the receiver.

4. In an aircraft presence warning system, a transponder for each aircraft comprising means for generating a continuous train of pulses, transmitter means coupled to the output of the pulse generating means to transmit interrogation pulses to other transponders, receiving means for deriving pulses from other transponders, means for retransmitting selected pulses derived from the receiving means, and indicating means responsive to the pulses from the pulse generating means and to pulses derived from the receiver output for providing an indication of the time interval between the transmission of the pulses and reception of the selected pulses derived from the receiver.

5. Apparatus as defined in claim 4 wherein the indicating means comprises a cathode ray tube, means for sweeping the beam across the tube screen in response to each of the pulses from the pulse generating means, and means for biasing on the beam in response to pulses derived from the receiver output.

6. A transponder for use in an aircraft collision warning system in which an identical transponder is located in each of the neighboring aircraft, the transponder comprising a transmitter and a receiver tuned to the same carrier frequency, means for generating a continuous train of pulses, means responsive to the output pulses from the pulse generating means for modulating the transmitter to produce transmitted interrogation signals, means for modulating the transmitter in response to a selected portion of the received signals derived from the receiver to produce transmitted reply signals, said last-named means providing a modulation distinct from the modulation produced by the pulses from said pulse generating means, whereby the transmitted interrogation signals and the transmitted reply signals are distinctively modulated, means coupled to the receiver for discriminating between the distinctly modulated interrogation signals and reply signals derived from the receiver, said means producing a first output in response to the received interrogation signals and a second output in response to the received reply signals from other transponders, the first output being coupled to said means for modulating the transmitter in response to received signals, and indicating means responsive to the received reply signals as derived from the second output of said discriminating means and to the pulses from said pulse generating means for indicating the time delay between the transmitted interrogation signals and the received reply signals.

7. Apparatus as defined in claim 6 wherein said means for modulating the transmitter in response to pulses from the pulse generating means comprises pulse modulating means for pulsing the transmitter on for a first predetermined time interval in response to each pulse from the pulse generating means, and said means for modulating the transmitter in response to a selected portion of received signals derived from the receiver comprises pulse modulating means for pulsing the transmitter on for a second predetermined time interval different than said first time interval, and said discriminating means coupled to the receiver comprising means for separating received signals into selected portions according to the pulse time duration, received pulses corresponding in duration to said first predetermined time interval being coupled to the transmitter modulating means, and received pulses corresponding in duration to said second predetermined time interval producing an output which is coupled to the indicating means.

8. Apparatus as defined in claim 6 wherein said means for modulating the transmitter in response to pulses from the pulse generating means comprises pulse modulating means for pulsing the transmitter on momentarily a first predetermined number of times in response to each pulse from the pulse generating means, and said means for modulating the transmitter in response to a selected portion of received signals derived from the receiver comprises pulse modulating means for pulsing the transmitter on momentarily for a second predetermined number of times different than the first, and said discriminating means coupled to the receiver comprising means for separating received signals into selected portions according to the number of pulses received in a group, received pulses corresponding in number to said first predetermined number of pulses being coupled to the transmitter modulating means, and received pulses corresponding in number to said second predetermined number of pulses producing an output which is coupled to the indicating means.

9. Apparatus as defined in claim 6 wherein the indicating means comprises a cathode ray tube, means for sweeping the beam across the screen in response to each of the pulses from the pulse generating means, and means for modifying the beam momentarily in response to the output coupled to the indicator from said discriminator means.

10. Collision warning apparatus comprising means for generating pulses, means for transmitting a carrier modulated interrogation signal in response to the output of the pulse generating means, receiving means, means for disabling the receiving means when the transmitting means is transmitting an interrogation signal, means for transmitting a carrier modulated reply signal having a different modulation characteristic than the interrogation signals in response to interrogation signals only derived from the receiver including means for separating received interrogation signals and received reply signals in response to their respective modulation characteristics, and means responsive to the reply signal derived from said signal separating means and the output of the pulse generating means for indicating the time intervals between the transmitting of an interrogation signal in response to a pulse from the pulse generating means and the reception of subsequent reply signals as derived from the signal separating means.

11. Apparatus as defined in claim 10 wherein the means for transmitting the interrogation signals includes means for producing carrier pulses of a first predetermined time duration and the means for transmitting the reply signals includes means for producing carrier pulses of a second predetermined time duration different from the first.

12. Apparatus as defined in claim 10 wherein the means for transmitting the interrogation signals includes means for producing a first predetermined number of carrier pulses in response to pulses from the pulse generating means and the means for transmitting the reply signals includes means for producing a second predetermined number of carrier pulses in response to an interrogation signal derived from the signal separating means.

13. Apparatus as defined in claim 10 wherein the indicating means includes pulse generating means, the output pulse generated being initiated in synchronism with a transmitted interrogation signal and being terminated in response to a received reply signal, averaging means coupled to the pulse generating means for providing a voltage having a level varying according to changes in the duration of the pulses generated, and an indicator for providing an indication when the output voltage of the averaging circuit reaches a predetermined level.

14. Apparatus as defined in claim 10 wherein the indicating means includes a plurality of pulse generating means, the respective pulses being simultaneously initiated in synchronism with a transmitted interrogation signal, means for successively terminating the respective pulses generated by the pulse generating means in response to successively received reply signals, averaging means coupled to the respective averaging means for providing an indication when the respective output voltages of the averaging means reach predetermined levels.

15. Apparatus as defined in claim 10 wherein the indicating means includes a plurality of gate circuits for separately gating received reply signals as derived from the signal separating means, means for gating open said gating circuits at successively delayed intervals in response to a pulse from said pulse generating means, averaging circuit means coupled to the outputs of the gate circuits, and indication means coupled to the respective average circuit means for providing an indication when the respective output voltages of the averaging circuit means reach predetermined levels.

16. A distance indicating transponder system for operation among a number of aircraft, said system comprising an identical transponder at each aircraft, the transponders each including a transmitter and receiver tuned to a common carrier frequency, a pulse generator, means for modulating the transmitter output in response to the pulses from said generator, means responsive to the output pulses from said generator for disabling the transmitter for a fixed time interval following the generation of a pulse by said generator, means for modulating the transmitter output in response to the output derived from the receiver, and means for indicating the time delay between the transmitted pulses and pulses received during the interval the transmitter is disabled, said indicating means including means for integrating the received pulses over a period corresponding to a substantial number of cycles of the pulse generator, whereby the indicating means discriminates between pulses received randomly and pulses received synchronously with respect to the pulses generated by the pulse generator.

17. A distance indicating transponder system for operation among a number of aircraft, the transponders each including a pulse generator, means for transmitting a pulse signal in response to pulses from said generator, means responsive to the output pulses from said generator for disabling the transmitting means for a fixed time interval following the generation of a pulse by said generator, means for receiving pulse signals, means for transmitting a pulse signal in response to the output derived from the receiver, and means for indicating the time delay between the locally generated pulses and the pulse signals received during the interval the transmitter is disabled, said indicating means including means for integrating of the received pulses over a period corresponding to a substantial number of cycles of the pulse generator, whereby the indicating means discriminates between pulses received randomly and pulses received synchronously with respect to the pulses generated by the pulse generator.

18. Collision warning apparatus comprising means for generating a pulsed radio frequency signal having a first distinct modulation, means for radiating said signal in a directional beam, means for rotating said directional radiating means to scan the beam in azimuth, omni-directional receiving means including means responsive to the first distinct modulation of the transmitted signal for separating out pulses from the received signals in response to signals having said first distinct modulation characteristics, omni-directional transmitting means for generating a pulsed radio frequency signal having a second distinct modulation characteristic, said transmitting means being pulsed in response to the separated pulses derived from received signals having the first distinct modulation characteristic, and a cathode ray tube indicator including means synchronized with said pulsed radio frequency signal for sweeping the cathode ray beam along a radial line on the face of the cathode ray tube, means synchronized with the rotation of the directional radiating means for rotating said radial line on the face of the tube, and beam intensity modulating means for biasing on the cathode ray beam in response to pulses derived from said separating means resulting from received signals having the second distinct modulation characteristics.

19. Collision warning apparatus comprising means for generating a pulsed radio frequency signal having a distinct modulation first means for radiating said signal in a directional beam, means for rotating said directional radiating means to scan the beam in azimuth, omni-directional receiving means including means responsive to the first distinct modulation of the transmitted signal for separating out pulses from the received signals in response to signals having said first distinct modulation characteristic, omni-directional transmitting means for generating a pulsed radio frequency signal having a second distinct modulation characteristic, said transmitting means being pulsed in response to the separated pulses derived from received signals having the first distinct modulation characteristic, and a cathode ray tube indicator including means synchronized with said pulsed radio frequency signal for sweeping the cathode ray beam along a radial line on the face of the cathode ray tube, means synchronized with the rotation of the directional radiating means for rotating said radial line on the face of the tube, and beam intensity modulating means for biasing on the cathode ray beam in response to pulses derived from said separating means resulting from received signals having the second distinct modulation characteristics, means synchronized with rotation of the radiating means for indicating azimuth of other aircraft responding to the directionally transmitted signal, and means for indicating range as a function of the time delay between a pulsed signal having said first distinct modulation characteristic and a subsequent pulsed received signal having the second distinct modulation characteristic.

20. Collision warning apparatus comprising means for generating a pulsed omni-directional radio signal having a first distinct modulation characteristic, omni-directional receiving means including means responsive to the first distinct modulation characteristic of the transmitted signal to derive a separate output in response to received signals having said distinct modulation characteristic from received signals having other than said distinct modulation characteristic, means for transmitting pulsed omni-directional radio signals having a second distinct modulation characteristic different than the first modulation characteristic, said means being driven by said separate output of said received signal responsive means, directional receiving means, means for scanning said directional receiving means in azimuth, and a cathode ray tube indicator including means synchronized with said pulsed radio signal for sweeping the cathode ray beam along a radial line on the face of the cathode ray tube, means synchronized with the scanning of the directional receiving means for rotating said radial line on the face of the tube, and beam intensity modulating means for biasing on the cathode ray beam in response to the output from the directional receiving means.

21. Collision warning apparatus comprising means for generating a pulsed omni-directional radio signal having a first distinct modulation characteristic, omni-directional receiving means including means responsive to the first distinct modulation characteristic of the transmitted signal to derive a separate output in response to received signals having said distinct modulation characteristic from received signals having other than said distinct modulation characteristic, means for transmitting pulsed omni-directional radio signals having a second distinct modulation characteristic different than the first modulation characteristic, said means being driven by said separate output of said received signal responsive means, directional receiving means, means for scanning said directional receiving means in azimuth, means synchronized with rotation of the radiating means for indicating azimuth of other aircraft responding to the directionally transmitted signal, and means for indicating range as a function of the time delay between a pulsed signal having said first distinct modulation characteristic and a subsequent pulsed received signal having the second distinct modulation characteristic.

22. Apparatus as defined in claim 21 wherein each of said two receiving means includes automatic gain control means for producing an automatic gain control voltage, and means for intercoupling the gain control voltages between the two receiving means to limit the gain of both receivers in accordance with the signal strength of the stronger received signal.

References Cited in the file of this patent

UNITED STATES PATENTS

| | | |
|---|---|---|
| 1,989,086 | Diamond | Jan. 29, 1935 |
| 2,146,724 | Dunmore | Feb. 14, 1939 |
| 2,157,122 | Dunmore | May 9, 1939 |